United States Patent
Bates et al.

(10) Patent No.: US 7,764,460 B2
(45) Date of Patent: Jul. 27, 2010

(54) ADJUSTING READ HEADS BASED ON MISREGISTRATION CALCULATED FROM SERVO PATTERNS

(75) Inventors: Allen Keith Bates, Tucson, AZ (US); Nhan Xuan Bui, Tucson, AZ (US); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/212,568

(22) Filed: Sep. 17, 2008

(65) Prior Publication Data
US 2010/0067139 A1    Mar. 18, 2010

(51) Int. Cl.
G11B 5/584   (2006.01)
G11B 5/58    (2006.01)
G11B 20/20   (2006.01)

(52) U.S. Cl. .................. 360/77.12; 360/77.01; 360/76
(58) Field of Classification Search ................ None
See application file for complete search history.

(56) References Cited

U.S. PATENT DOCUMENTS

| | | | |
|---|---|---|---|
| 5,027,245 A | 6/1991 | Nagata et al. | |
| 5,450,257 A | 9/1995 | Tran et al. | |
| 5,675,448 A | 10/1997 | Molstad et al. | |
| 6,222,698 B1 | 4/2001 | Barndt et al. | |
| 6,275,350 B1 | 8/2001 | Barndt et al. | |
| 6,771,456 B2 | 8/2004 | Winarski et al. | |
| 6,873,487 B2 | 3/2005 | Molstad | |
| 7,054,093 B1 | 5/2006 | Anderson et al. | |
| 7,054,097 B1 | 5/2006 | Yip et al. | |
| 7,307,809 B2 | 12/2007 | Neumann | |
| 7,342,738 B1 | 3/2008 | Anderson et al. | |
| 2004/0120070 A1* | 6/2004 | Ito ............................. | 360/76 |
| 2007/0285831 A1* | 12/2007 | Goker et al. ............ | 360/77.12 |

FOREIGN PATENT DOCUMENTS

JP     64-89001     4/1989

OTHER PUBLICATIONS

English Abstract of JP 64-89001 filed Apr. 3, 1989.

* cited by examiner

*Primary Examiner*—Andrew L Sniezek
(74) *Attorney, Agent, or Firm*—David W. Victor; Konrad Raynes & Victor LLP (57) ABSTRACT

Provided are a method, storage controller, and tape drive for adjusting read heads based on misregistration calculated from servo patterns. A plurality of first read heads read a plurality of servo patterns on a storage medium. A determination is made from the read servo patterns a skew at which the first read heads are positioned with respect to the servo patterns written to the storage medium. A determination is made of an adjustment factor to eliminate the determined skew. A plurality of second read heads that read the storage medium are adjusted by the adjustment factor.

23 Claims, 6 Drawing Sheets

ADJUSTING READ HEADS BASED ON MISREGISTRATION CALCULATED FROM SERVO PATTERNS

BACKGROUND

1. Field

The present invention relates to a method, storage controller, and tape drive for adjusting read heads based on misregistration calculated from servo patterns.

2. Description of the Related Art

Advanced magnetic-tape cartridges will hold multiple Terabytes (TB) of data, where one Terabyte equals 1000 Gigabytes and one Gigabyte equals 1000 Megabytes. The recording densities necessary to achieve this capacity require that the read head elements have nearly or identically the width of the write head elements. Problems can arise in such high density magnetic tape cartridges if the tape medium becomes skewed due to heat or density, which can cause the read heads to read off-track during the write-verify, and this misregistration resulting in either write-verify errors or the inability to write-verify altogether. The write-verify process is actually the reading of the freshly written data during the actual write process.

Servo patterns may be used to determine an extent of misregistration, or the extent to which a read head is reading off the track. In timing-based servo (TBS) systems, recorded servo patterns consist of magnetic transitions with two different azimuthal slopes. Head position is derived from the relative timing of pulses, or dibits, generated by a narrow head reading the servo patterns. TBS patterns also allow the encoding of additional longitudinal position (LPOS) information without affecting the generation of the transversal position error signal (PES). This is obtained by shifting transitions from their nominal pattern position using pulse-position modulation (PPM). A specification for the servo format in current tape drives is provided by the linear tape-open (LTO) format. The complete format for LTO drives of generation 1 (LTO-1) was standardized by the European Computer Manufacturers Association (ECMA) in 2001 as ECMA-319. Additional information on LTO technology, in particular on LTO drives of generations 2 to 4 (LTO-2 to LTO-4), where the servo format was not modified, can be found on the World Wide Web (www) at ultrium.com. Traditionally, the detection of LPOS information bits is based on the observation of the arrival times of the shifted dibit peaks within the servo bursts at the servo reader output.

The timing-based servo (TBS) technology, which was developed specifically for linear tape drives and is also used in all LTO tape drive products, provides the basic structure of a servo frame, consisting of four servo bursts. The signal obtained by reading the servo pattern is used to extract essential servo-channel parameters such as tape velocity, read head y-position, and longitudinal position (LPOS) information, which is encoded by using pulse-position modulation (PPM).

SUMMARY

Provided are a method, storage controller, and tape drive for adjusting read heads based on misregistration calculated from servo patterns. A plurality of first read heads read a plurality of servo patterns on a storage medium. A determination is made from the read servo patterns a skew at which the first read heads are positioned with respect to the servo patterns written to the storage medium. A determination is made of an adjustment factor to eliminate the determined skew. A plurality of second read heads that read the storage medium are adjusted by the adjustment factor.

DETAILED DESCRIPTION

Figure 1:
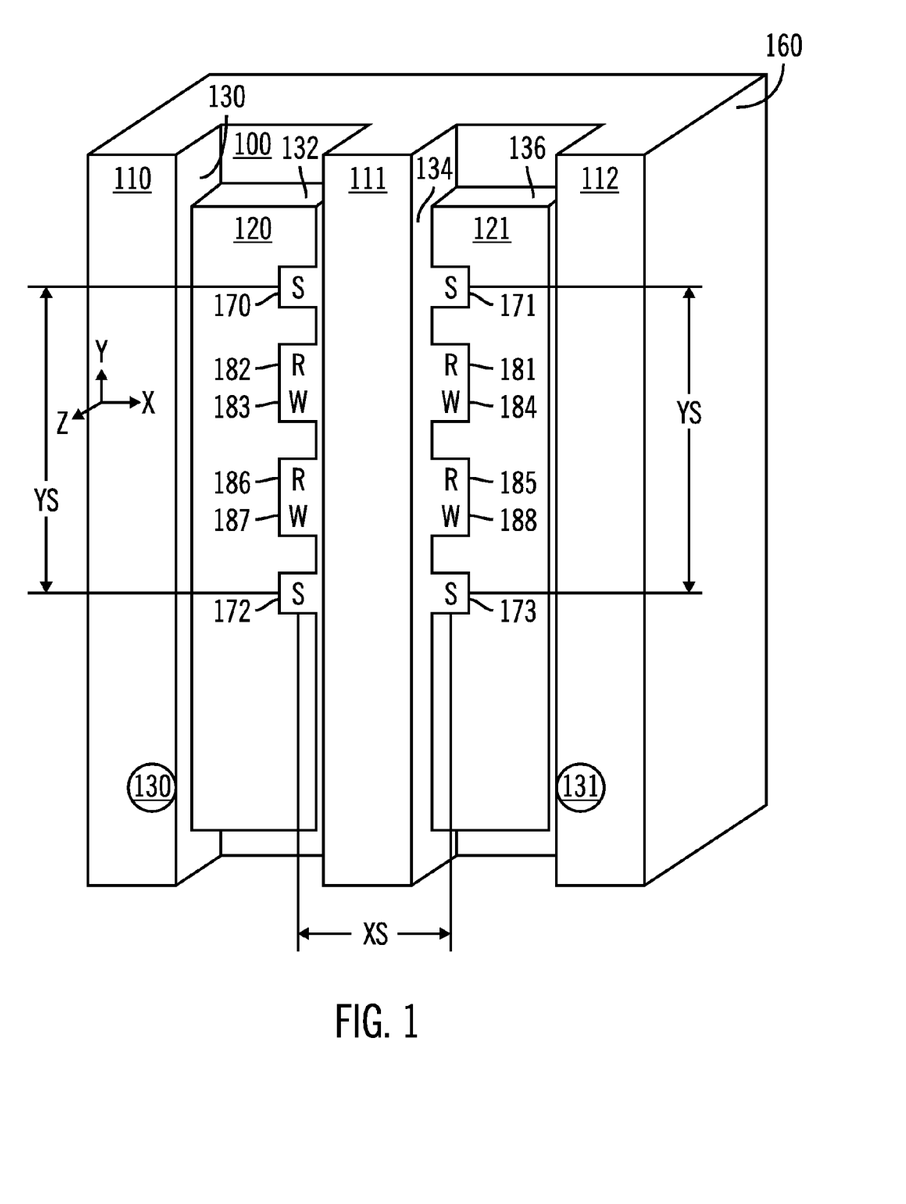
FIG. 1 illustrates an embodiment of a tape head.

FIG. 1 depicts a Micro-electromechanical systems (MEMS) tape head 100 according to one exemplary embodiment of the present invention. Magnetic or optical tape moves across the head 100 along the +/−X direction. The tape head 100 comprises microsliders 120 and 121 that are articulated in the +/−Y direction, which is considered the transverse or lateral direction relative to the direction in which the tape moves across head 100. Microsliders 120 and 121 are constrained in the X direction by walls 110, 111 and 112, as depicted. Movement of microsliders 120 and 121 is provided by controllable micromotors 130 and 131, respectively. Micromotors 130 and 131 are disposed in the walls, as shown, and are in mechanical contact with the microsliders, preferably in a rack and pinion relationship. Alternatively, the micromotors could be above or below the microsliders, or disposed underneath the microsliders. Micromotors 130 and 131 could also be electromagnets. At the outset, the microsliders 120, 121 provide "fine" position movement of the head elements (e.g., read, write, servo) with respect to the tape. "Coarse" position movement along the +/−Y direction is provided in a conventional manner, i.e., by moving the entire head body block 160. "Fine," as used herein means movement of the microsliders along the +/−Y direction with greater resolution and faster dynamic response than the smallest incremental "coarse" movement, and will be described herein with reference to movement of the microsliders. Likewise, "coarse" as used herein means movement outside the range of the "fine" movement range, and will generally be described herein with reference to movement of the entire head. Of course, overlap could exist between fine and coarse position movement, and the present invention is intended to cover a range of fine and coarse movement.

Dynamically responsive fine seek capability is provided by microsliders 120 and 121, due to their inherently low mass. As is depicted, microsliders 120 and 121 include the servo read elements (S) 170-173; the data write elements (W) 181, 183, 185, 187; and the data read elements (R) 182, 184, 186, and 188. Servo read elements (S) 170-173 and data read elements (R) 182, 184, 186, and 188 could be fabricated from AMR (Anistropic Magnetoresistive), GMR (Giant Magnetoresistive), or TMR (Tunnel Magnetoresistive) technology. Data write elements (W) 181, 183, 185, 187 could be fabricated from thin film technology. In the exemplary embodiment the head module 100 includes a plurality of read/write elements 181-188 for data input and output. Single element read heads may be used for the servo elements 170-173. The quantity of read/write elements per microslider will typically be a function of the quantity of grouped data tracks per module desired. The read, write, and servo elements can be attached to the microsliders 120 or 121 using adhesive or epoxy, or photolithographed directly to the microsliders, in a manner well understood in this art. To achieve economy of scale, the same design of microslider may be used for different quantity of tracks per module and each read/write head can be tested prior to installation between walls 110, 111 and 112.

The vertical distance between servo read elements 170 and 172 and servo read elements 171 and 173 is "YS" and the horizontal distance between the microsliders 120 and 121 is "XS".

To permit bi-directional tape flow and write-verify operations, a read head on slider 120 is positioned in line, along the X axis, relative to a write head on slider 121. For example, when the tape is moving in the +X direction, write elements 183 and 187 would write data and read element 184 and 188, respectively would write-verify that data. Then, when the tape is moving in the −X direction, write elements 181 and 185 would write data and read element 182 and 186, respectively would write-verify that data. As a general statement, the read and write elements on sliders 120 and 121 are disposed in an alternating fashion, as shown in FIG. 1. To provide for manufacturing tolerances, the exemplary head of FIG. 1 includes a predetermined gap 130, 132 and 134, 136 on either side of the microsliders 120 and 121, respectively, so that manufacturing variances within a predetermined tolerance of the microsliders 120 and/or 121 and/or walls 110, 111 or 112 will not cause sticking or friction between the walls and the microslider during articulation in the +/−Y direction. Polytetrafluoroethylene, which is commonly known by the trade name TEFLON, or Diamond-Like Carbon (DLC) could be used in gaps 130, 132 and 134, 136 to lessen friction between microsliders 120 and 121 and walls 110-112 as well as head body 160.

Microsliders 120-121 are disposed generally parallel to one another, and are arranged so that corresponding read/write elements are aligned along the X-axis. The present invention contemplates that microsliders 120-121 may be offset along the Y-axis during the writing of data by a write element, in order to accommodate tape skew during the write-verify process by the corresponding read element.

Figure 2:
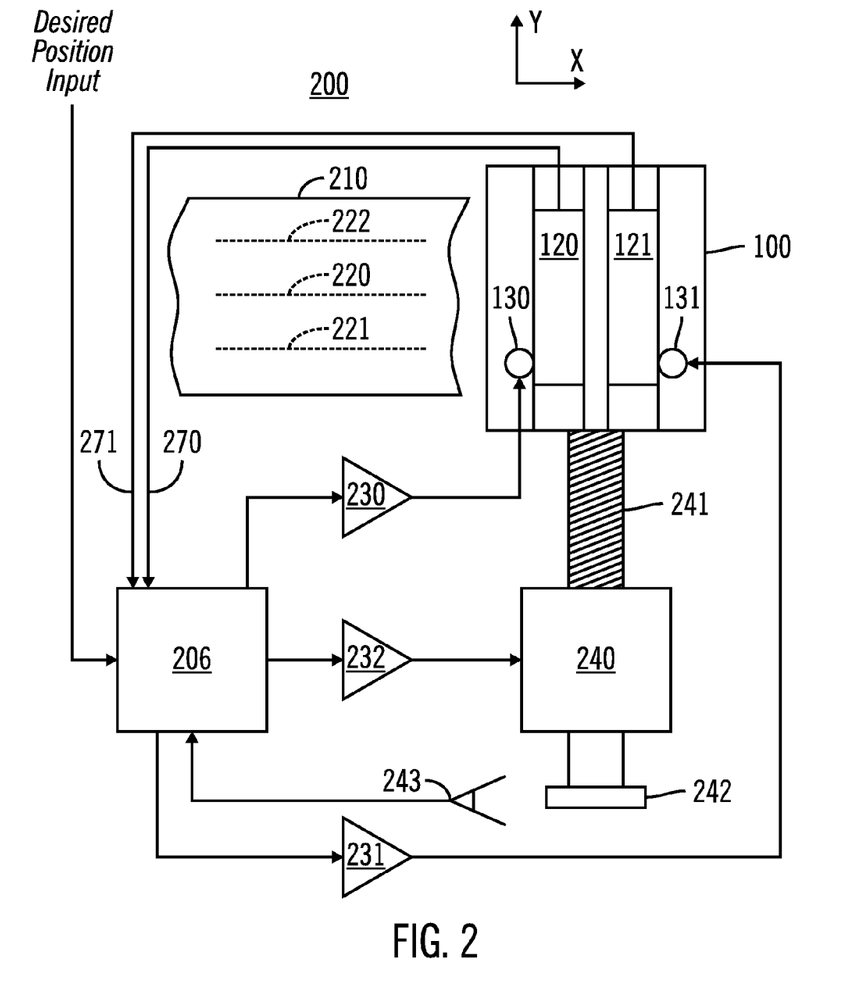
FIG. 2 illustrates an embodiment of a tape drive.

FIG. 2 depicts a system-level diagram of an exemplary closed-loop control system for motion control of the tape head of the present invention. Control system 200 uses controller 206 for gathering actual positional information, comparing that to the desired position, and effecting necessary coarse and fine positional changes along the +/−Y direction of head 100 to permit data I/O. Controller 206 may be a standard microprocessor with microcode instructions stored either inside the controller 206 or in a separate EPROM, which is not shown. Based on the difference between the actual position of head 100 and the desired position of head 100, controller 206 supplies low-level coarse position signals to power amplifier 232, which amplifies those coarse position signals into sufficient voltage and amperage to turn lead-screw motor 240. Lead screw motor 240 turns coarse position lead screw 241, which is directly connected to head 100. As lead screw 241 is turned by lead screw motor 240, the elevation or position of head 100 along the +/−Y axis is changed. Control system 200 includes a rotary digital tachometer 242 attached to lead screw motor 240 that is read by optical sensor 243. Thus, optical sensor 243 reads coarse position motion of lead screw 241, as turned by lead screw motor 240. Controller 206, having been programmed to know the pitch of lead screw 241, then knows the elevation of head 100 by the number of turns and fraction thereof made by lead screw 241. Thus, the coarse position is a closed loop servo system. Alternatives to lead screw motor 240 and lead screw 241 could include an electromagnet.

Control system 200 also includes an independent fine position control for each individual microslider 120 and 121, to adjust the relative position of the microsliders relative to head body 160 in the Y direction with respect to tape 210. Tape 210 has one or more servo tracks 220 and one or more groups of data tracks 221-222. Controller 206 receives servo positional information from servo read elements 170 or 172 on microslider 120 and servo read elements 171 or 173 on microslider 121. In regards to servo track 220, servo elements 170 and 171 would be used to control microsliders 120 and 121 for performing I/O on data track group 221, which is below servo track 220. Similarly, servo elements 172 and 173 would be used to control microsliders 120 and 121 for performing I/O on data track group 222, which is above servo track 220. Thus, one servo track can be used to provide positional information to controller 206 for more than one group of data tracks.

Controller 206 receives the servo positional information from microslider 120 via head cable 270 and from microslider 121 via head cable 271 These head cables are short, to prevent capacitive and inductive properties of the head cables from distorting the positional information. Also, these head cables are flexible to allow unencumbered motion of microsliders 120 and 121. Head cables 270-271 also carry data I/O information.

Controller 206 compares the actual position of microsliders 120 and 121 relative to the target servo track and compares that to the desired position. Controller 206 uses this comparison to correct the positions of microsliders 120 and 121 by sending signals to power amplifiers 230 and 231. Power amplifiers 230 and 231 amplify the low level signals from controller 206 into sufficient voltage and amperage to activate micromotors 130 and 131, respectively. Micromotors 130 and 131 then move micro sliders 120 and 121 to the desired position. Thus, there is a closed loop fine position control for each microslider on head 100.

The coarse position closed loop and each fine position closed loop are independent. However, each closed-loop can operate simultaneously, to position the read and write elements 181-188 over the desired groups of data tracks 221-222.

Servo track 220 may include longitudinal (X direction) positional information included along with the information for lateral (Y direction) serving. This information, read by servo elements 170-173, identifies the regions of the tape that read and write elements 181-188 of head 100 are over. This information, which is factory written to the tape, could be used to compliment the coarse positioning of head 100, or to eliminate digital tachometer 242 and its reader 243 from the coarse position control loop.

Figure 3:
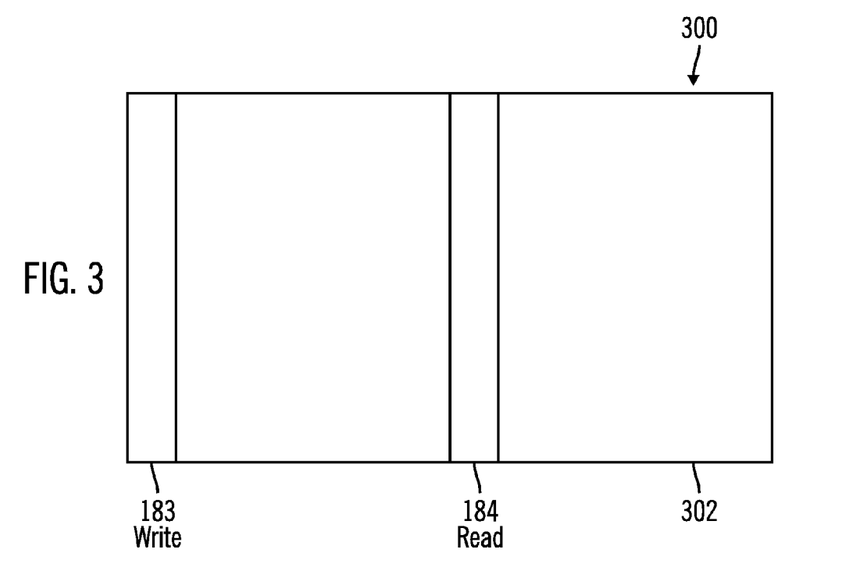
FIG. 3 illustrates an example when there is no skew with respect to the position of the tape medium and the read heads.

FIG. 3 illustrates track 300, such as tracks 222 and 221 (FIG. 2), such that write head 183 on microslider 120 writes data to track 300, as the tape medium moves from left-to-right, and read head 184 on microslider 121 reads the data as part of a write-verify operation to verify that write head 183 wrote the data correctly. The written data 302 is shown as properly registered because the track 300 is perfectly aligned on the X-axis of the read head 184. In this case, there is no misregistration of the read head 184 to the track 300 on the tape medium and no adjustment is needed.

Figure 4:
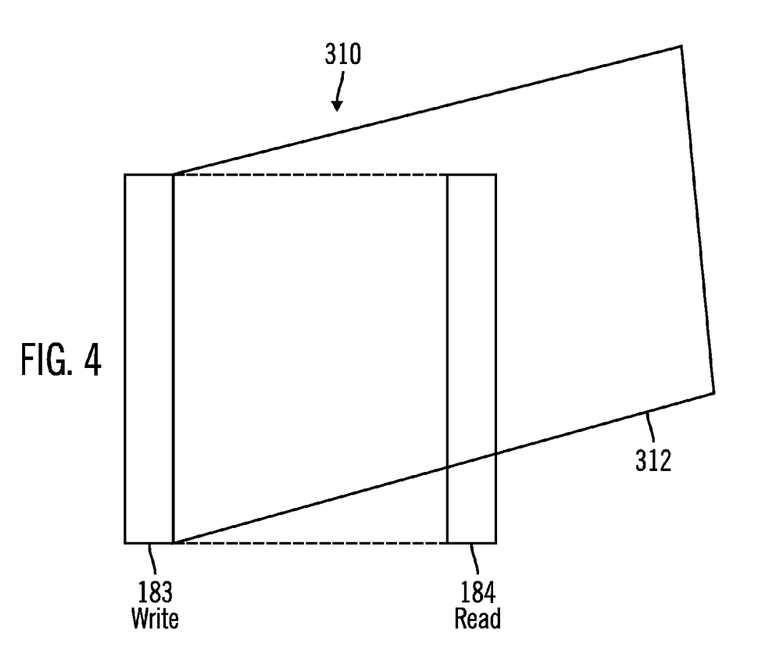
FIGS. 4 and 5 illustrate examples of skew with respect to the position of the tape medium and the read heads.

FIG. 4 illustrates track 310, such as tracks 222 and 221 (FIG. 2), such that write head 183 on microslider 120 writes data to the track, as the tape medium moves from left-to-right, and read head 184 on microslider 121 reads the data as part of a write-verify operation to verify that write head 183 wrote the data correctly. The written data 312 is shown as skewed with respect to the read head 184 with a negative misregistration, which means the read head 184 may be reading data from adjacent tracks other than track 312 to which the data is written. In FIG. 4, the written track is skewed about the Z-axis and thus the read element 184 is off-track on its lower portion, and possibly reading the adjacent track during the write-verify operation.

Figure 5:
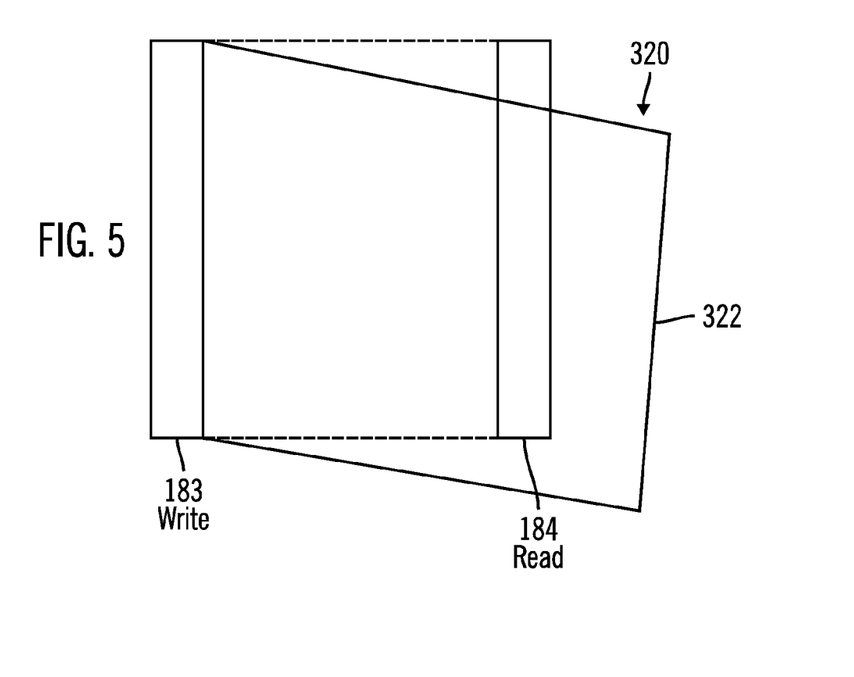

FIG. 5 illustrates a track 320, such as tracks 222 and 221 (FIG. 2), such that write head 183 on microslider 120 writes data to the track, as the tape medium moves from left-to-right, and read head 184 on microslider 121 reads the data as part of a write-verify operation to verify that write head 183 wrote the data correctly. The written data 322 is shown as skewed with respect to the read head 184 with a positive misregistration, which means the read head 184 may be reading data from adjacent tracks other than track 312 to which the data is written. In FIG. 5, the written track is skewed about the Z-axis and thus the read element 184 is off-track on its upper portion, and possibly reading the adjacent track during the write-verify operation.

The skewing of the magnetic tape can occur during the write process. Since magnetic tape comprises a recording media on a flexible strip, skew of the tape during the write process may occur frequently.

Figure 6:
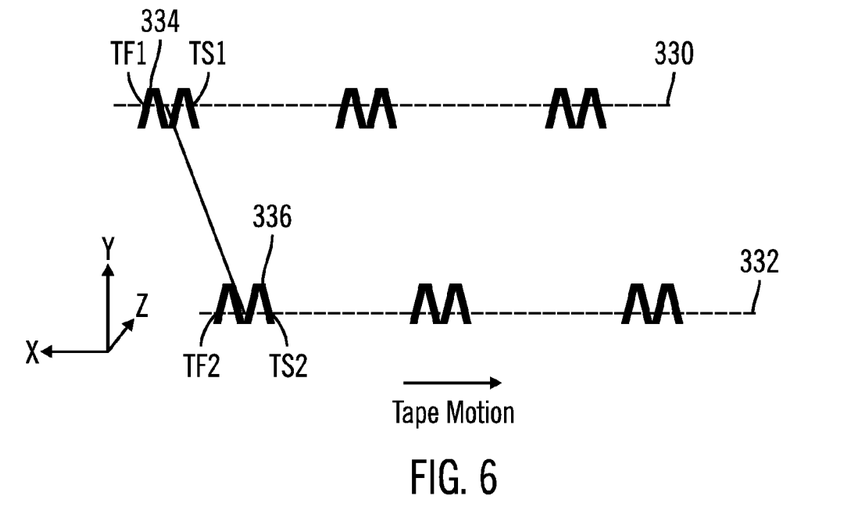
FIG. 6 illustrates servo patterns read by read heads.

FIG. 6 illustrates an example of two servo patterns 330 and 332 read by servo read elements 170 and 172 (FIG. 1) on microslider 120 (or 171 and 173 on microslider 121), spaced apart by distance YS (shown in FIG. 1) to determine whether the read microslider 121 needs to be adjusted to remove the effect of misregistration. Each servo pattern 330 and 332 has a timing based servo pattern, such as patterns 334, 336, shown as M-pattern /\\/\\ Timing Based Servo (TBS) bursts. In alternative embodiments, different servo timing patterns could be used, N-pattern /\\/ , Chevron / \\ pattern, W-pattern \\/\\/, etc. "TS1" indicates the start time servo read head 170 starts reading servo pattern 334, "TF1" indicates the finish time servo read head 170 finishes reading the servo pattern 334, "TS2" indicates the start time servo read head 172 starts reading servo pattern 336, and "TF2" indicates the finish time servo read head 172 finishes reading the servo pattern 336. If the servo read heads 170 and 172 do not read the servo patterns at the same start and finish time, then the tape medium is skewed with respect to the read heads 170 and 172, and would appear as in FIG. 4 or 5. The tape medium can become skewed with respect to the read heads because the magnetic tape, upon which the timing based servo patterns are written, may stretch due to thermal and hygroscopic (humidity) effects.

Figure 7:
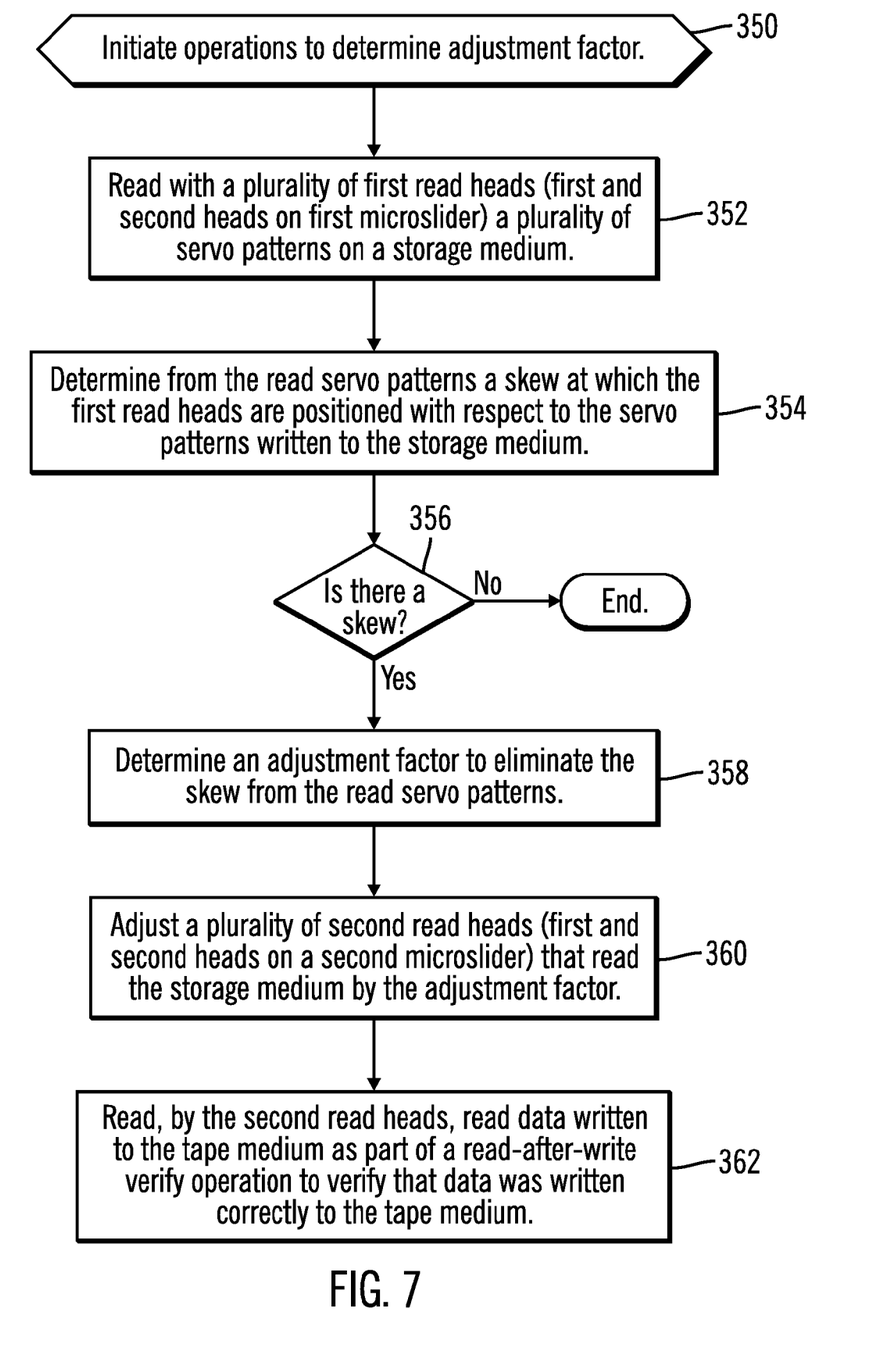
FIG. 7 illustrates an embodiment of operations to determine an adjustment factor for read heads.

FIG. 7 illustrates an embodiment of operations performed by the controller 206 and the elements of the micrsoliders 120, and 121 to determine an amount of misregistration due to tape skew and the adjustment factor to adjust the read heads on the second microslider 121 so the tape is properly read during a write-verify operation. Upon initiating operations (at block 350) to determine the adjustment factor, first read heads, e.g., servo read heads 170 and 172 on microslider 120, read (at block 352) servo patterns 334, 336 on a storage medium, such as a magnetic or optical tape medium. The controller 206 determines (at block 354) from the read servo patterns 334, 336 a skew at which the first read heads 170 and 172 are positioned with respect to the servo patterns 334, 336 written to the storage medium, e.g., tape medium.

To determine the skew, the controller 206 may calculate a skew timing based on the start and finish of the read heads 170 and 171 reading the servo patterns 334, 336 according to equation (1) below:

$$\text{Skew\_timing} = (TF2 + TS2)/2 - (TF1 + TS1)/2 \tag{1}$$

The skew timing in equation (1) is not affected by thermal and hygroscopic effects because those effects are subtracted out by the minus sign in equation (1).

The controller 206 may further calculate the skew angle of the tape with respect to the horizontal (X) axis of the servo read heads 170 and 172 according to equation (2) below by the skew timing of equation (1) using the velocity of the tape ("V_tape") to convert the skew timing into a distance, and then dividing the result by the spaced-apart distance YS of the servo read heads 170 and 171.

$$\text{Skew\_Angle} = (TF2 + TS2 - TF1 - TS1) * V\_tape/(2*YS) \tag{2}$$

In certain embodiments, the TAN(skew_angle)=SIN(skew_angle)=skew_angle, because the skew_angle is typically small in absolute value (less than 5 degrees).

The skew angle may then be used to determine the amount of misregistration, i.e., the distance that the servo read heads 170 and 172 tape are reading off the tracks they are supposed to read to perform the write-verify operation. The separation of microsliders 120 and 121 is given by XS (FIG. 1), and XS may be on the order of 1.5 mm.

$$\text{Misregistration} = XS*(TF2 - TF1 + TS2 - TS1)*V\_tape/(2*YS) \tag{3}$$

In the misregistration calculation of equation (3), if the lower servo timing pattern 336 leads the upper servo timing pattern 334 as shown in FIG. 6, then the misregistration of microslider 121 is negative and hence it is riding low, which corresponds to the misregistration shown in FIG. 4. A positive adjustment factor calculated using equation (4) indicates that microslider 121 needs to be raised, which is also consistent with FIG. 4. The misregistration calculated in equation (3) may be calculated based on the skew_timing of multiple timing based servo patterns, such as the patterns comprising an ABCD burst.

If the controller 206 determines (at block 356) that there is no skew, i.e., the calculated skew timing or skew angle is zero, i.e., that there is no misregistration, then control ends because no adjustment is needed to the read heads. If (at block 356), there is a skew, i.e., the determined skew timing or angle is not zero, then the controller 206 determines (at block 358) an adjustment factor to eliminate the skew so that the read elements 184 and 188 on microslider 121 will read on track the data written by the write heads 183 and 187 on microslider 120 to verify that the written data is correct.

In one embodiment, the adjustment factor to apply to the microslider 121 having the read heads 184 and 188 that will read and verify the data written by write heads 183 and 187 may comprise the numerical negative (opposite) of the misregistration calculated according to equation (3), shown as equation (4) below:

$$\text{Adjustment} = -XS*(TF2 - TF1 + TS2 - TS1)*V\_tape/(2*YS) \tag{4}$$

The adjustment factor may also be calculated according to equation (5) below using the TF1 and TF2 read values:

$$\text{Adjustment} = -XS*(TF2 - TF1)*V\_tape/YS \tag{5}$$

The adjustment factor may also be calculated according to equation (6) below using the TS1 and TS2 read values:

$$\text{Adjustment} = -XS*(TS2 - TS1)*V\_tape/YS \text{ tm (6)}$$

Equations (5) and (6) are simplified versions of centroidal equation (4). Equation (5) may be used for "trailing edge" detection of dynamic skew and equation (6) may be used for "leading edge" detection of dynamic skew.

The controller 206 may control (at block 360) the tape head 160 to adjust a plurality of second read heads along the Y-axis (e.g., first 184 and second 188 heads on the microslider 121) that read the tape medium by the adjustment factor. Microsliders 120 and 121 may be moved relative to one another by piezo-electric actuators controlled by the controller 206. The microslider 120 writing is held stationary and the microslider 121 performing the write-verify is moved along the Y-axis based on the adjustment factor calculated according to equations (3), (4), or (5).

The second read heads (e.g., read heads 185 and 188 on microslider 121) read data written to the tape medium by write heads 183 and 184 to perform the write-read-verify operation to verify that data was written correctly to the tape medium (at block 362).

Figure 8:
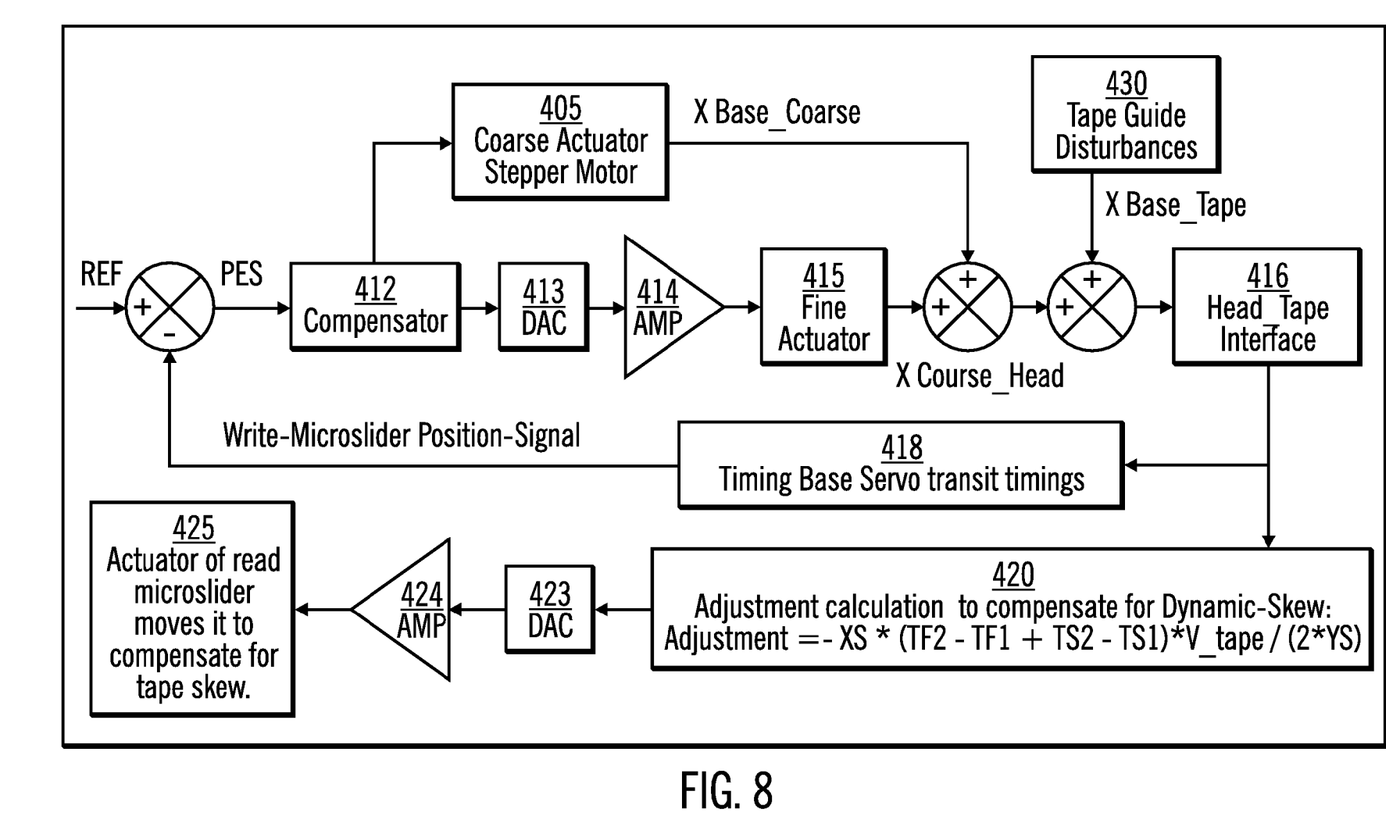
FIG. 8 illustrates an embodiment of a servo controller.

FIG. 8 shows an implementation of the controller 206 in FIG. 2 as servo controller 400. The servo controller 400 includes fine-actuator servo with position-error-signal (PES) positions to position the write-microslider 120 on track to write data using TBS transit timings 418, which are the A-to-B timings for the simple chevron/\ pattern. Fine positioning loop 412-413-414-415-416-418 is a closed-loop-system. Coarse-actuator servo, with compensator integrator, positions the body 160 of head 100 (FIG. 1) to enable the fine-actuator to operate in the center of its stroke, and hence write microslider 121 in the center of its stroke. Coarse-actuator loop 412-405-416-418 is also a closed-loop-system. Read-microslider 121 is driven by the skew-timing signal derived from the write-microslider, such as using equation (4), shown in block 420, to position itself on track to write-verify the track being written by the write-microslider 120. Components 420-423-424-425 comprise an open-loop-system. The same servo controller 400 may be used regardless of the direction of the serpentine-motion of the magnetic tape.

Described embodiments provide techniques to determine an amount of misregistration with the storage medium, using a first group of read heads, such as on a first microslider including the write heads writing data, and then determining an adjustment factor to adjust a second group of read heads, which may be on a second microslider, that will read the written data as part of a write-verify operation.

Additional Embodiment Details

The described components of the servo controller that calculates the adjustment factor may comprise discrete logic, ASIC (application specific integrated circuit), FPGA (field programmable gate array), custom processors, etc.

The described components of the servo channel embodiments and the operations of the servo channel components described with respect to FIG. 7 may alternatively be implemented in subroutines in programs or other software implementations executed by a processor. Such programs implementing the operations of the servo channel components described with respect to FIG. 8 may be implemented in a computer readable medium, such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.).

The described embodiments were described with respect to a tape medium passing under a tape head having micrsoliders including multiple servo reading, reading, and write elements. In alternative embodiments, the described embodiments may be used to adjust read heads for storage media other than tape, such as magnetic disk, optical storage, etc.

The described embodiments discussed adjusting the read heads for a write-verify operation. The described operations to adjust the read heads may also be used for operations other than write-verify.

In the described embodiments, the servo read heads used to read the servo pattern to determine the adjustment factor and the read heads to read the written data are on separate independently movable microsliders. In an alternative embodiment, the servo read heads and data read heads may be on a single movable element.

The components shown in FIGS. 2 and 8 shown as separate components may be implemented in a single circuit device or functions of one illustrated component may be implemented in separate circuit devices. Moreover, operations described with respect to certain components, such as generating the interpolation time instants and correlating the data, may be performed by other components in the servo channel. The described operations may be implemented as a method, computer program product or apparatus using standard programming and/or engineering techniques to produce software, firmware, hardware, or any combination thereof.

Each of the embodiments may take the form of an entirely hardware embodiment, an entirely software embodiment or an embodiment containing both hardware and software elements. The embodiments may be implemented in software, which includes but is not limited to firmware, resident software, microcode, etc.

The term logic may include, by way of example, software, hardware, firmware, and/or combinations of software and hardware.

The logic of FIG. 7 describes specific operations occurring in a particular order. In alternative embodiments, certain of the logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIG. 7 may be implemented in software, hardware, programmable and non-programmable gate array logic or in some combination of hardware, software, and/or gate array logic.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

What is claimed is:

1. A method, comprising:
reading with a plurality of first read heads a plurality of servo patterns on a storage medium;
determining from the read servo patterns a skew at which the first read heads are positioned with respect to the servo patterns written to the storage medium;
determining an adjustment factor to eliminate the determined skew; and
adjusting a plurality of second read heads that read the storage medium by the adjustment factor, wherein the first and second read heads are configured to be adjusted independently of one another, and wherein the first read heads remain stationary during the adjusting to eliminate the determined skew.

2. The method of claim 1, wherein the storage medium comprises a tape medium, wherein the first read heads are positioned on a first vertical axis and wherein the second read heads are positioned on a second vertical axis, and wherein the tape medium passes under the first and second read heads along a vertical axis.

3. The method of claim 2, wherein the adjustment factor indicates a vertical distance to move the second read heads to change a position at which they read the tape medium.

4. The method of claim 2, wherein determining the skew further comprises determining a skew timing indicating a differential timing at which first read heads read the servo patterns, and wherein determining the adjustment factor comprises using the skew timing to determine the adjustment factor as a function of a velocity of the tape medium and vertical distance between the first read heads.

5. The method of claim 4, wherein determining the skew further comprises determining a skew angle as a function of the differential timing at which the first read heads read the servo pattern, the velocity of the tape medium, and the vertical distance between the first read heads, wherein the skew angle is used to calculate the adjustment factor.

6. The method of claim 2, wherein the first read heads are on a first microslider and the second read heads are on a second microslider, wherein the first and second microsliders are configured to move independently of one another, and wherein adjusting the second read heads comprises adjusting the second microslider to adjust the position of the second read heads with respect to the storage medium.

7. The method of claim 6, wherein the first read heads on the first microslider include a first read head and a second read head, and wherein the servo patterns read by the first read heads comprise a first and second servo patterns, further comprising:
reading, by the first read head on the first microslider, at least one of a start (TS1) and end (TF1) of a first servo pattern;
reading, by the second read head on the first microslider, at least one of a start (TS2) and end (TF2) of a second servo pattern;
wherein determining the adjustment factor comprises using at least one of the read start (TS1 and TS2) and end (TF1 and TF2) of the first and second servo patterns, a velocity of the tape medium (V_tape), a vertical distance between the first and second read heads on the first microslider (YS), and a horizontal distance between the first and second microsliders (XS) to determine the adjustment factor.

8. The method of claim 7, wherein the second microslider has a first and second read heads separated by the vertical distance separating the first and second read heads on the first microslider.

9. The method of claim 7, wherein the adjustment factor comprises:
−XS*(TF2−TF1+TS2−TS1)*V_tape/(2*YS).

10. The method of claim 7, wherein the adjustment factor comprises:
−XS*(TF2−TF1)*V_tape/(2*YS).

11. The method of claim 7, wherein the adjustment factor comprises:
−XS*(TS2−TS1)*V_tape/(2*YS).

12. The method of claim 2, further comprising:
reading, by the second read heads, data written to the tape medium as part of a write-verify operation to verify that data was written correctly to the tape medium following the adjusting of the second read heads.

13. The method of claim 12, wherein the first read heads are on a first microslider including at least one write head and wherein the second read heads are on a second microslider, wherein the first and second microsliders are configured to move independently of one another, wherein adjusting the second read heads comprises adjusting the second microslider, further comprising:
writing, by the at least one write head on the first microslider, data to the storage medium, wherein the second read heads on the second microslider read the data written by the first microslider as part of the write-verify operation to verify the data written by the at least one write head.

14. A method, comprising:
reading, by a first read head, at least one of a start (TS1) and end (TF1) of a first servo pattern on a storage medium;
reading, by a second read head, at least one of a start (TS2) and end (TF2) of a second servo pattern on the storage medium;
determining from the read first and second servo patterns a skew timing comprising (TF2+TS2)/2−(TF1+TS1)/2;
determining an adjustment factor based on the skew timing; and
adjusting at least one additional read head that reads the storage medium by the adjustment factor.

15. A system for processing a storage medium, comprising:
a plurality of first read heads;
a plurality of second read heads;
a controller for performing operations to control the first and second read heads, the operations comprising:
reading with the first read heads a plurality of servo patterns on the storage medium;
determining from the read servo patterns a skew at which the first read heads are positioned with respect to the servo patterns written to the storage medium;
determining an adjustment factor to eliminate the determined skew; and
adjusting the second read heads that read the storage medium by the adjustment factor, wherein the first and second read heads are configured to be adjusted independently of one another, and wherein the first read heads remain stationary during the adjusting to eliminate the determined skew.

16. The system of claim 15, wherein the storage medium comprises a tape medium, wherein the first read heads are positioned on a first vertical axis and wherein the second read heads are positioned on a second vertical axis, and wherein the tape medium passes under the first and second read heads along a vertical axis.

17. The system of claim 16, wherein determining the skew further comprises determining a skew timing indicating a differential timing at which first read heads read the servo patterns, and wherein determining the adjustment factor comprises using the skew timing to determine the adjustment factor as a function of a velocity of the tape medium and vertical distance between the first read heads.

18. The system of claim 16, further comprising:
- a first microslider including the first read heads and at least one write head;
- a second microslider including the second read heads, wherein the first and second microsliders are configured to move independently of one another, and wherein adjusting the second read heads comprises adjusting the second microslider;
- wherein the controller further controls the first and second read heads to perform:
  - writing, by the at least one write head on the first microslider, data to the storage medium; and
  - reading, by the second read heads, data written to the tape medium as part of a write-verify operation to verify that data was written correctly to the tape medium.

19. An article of manufacture including code for causing operations for a plurality of first read heads and second read heads with respect to a storage medium, the operations comprising:
- reading with the first read heads a plurality of servo patterns on the storage medium;
- determining from the read servo patterns a skew at which the first read heads are positioned with respect to the servo patterns written to the storage medium;
- determining an adjustment factor to eliminate the determined skew; and
- adjusting the second read heads that read the storage medium by the adjustment factor, wherein the first and second read heads are configured to be adjusted independently of one another, and wherein the first read heads remain stationary during the adjusting to eliminate the determined skew.

20. The article of manufacture of claim 19, wherein the storage medium comprises a tape medium, wherein the first read heads are positioned on a first vertical axis and wherein the second read heads are positioned on a second vertical axis, and wherein the tape medium passes under the first and second read heads along a vertical axis.

21. The article of manufacture of claim 20, wherein determining the skew further comprises determining a skew timing indicating a differential timing at which first read heads read the servo patterns, and wherein determining the adjustment factor comprises using the skew timing to determine the adjustment factor as a function of a velocity of the tape medium and vertical distance between the first read heads.

22. The article of manufacture of claim 20, wherein the operations further comprise:
- reading, by the second read heads, data written to the tape medium as part of a write-verify operation to verify that data was written correctly to the tape medium.

23. The article of manufacture of claim 22, wherein the first read heads are on a first microslider including at least one write head and wherein the second read heads are on a second microslider, wherein the first and second microsliders are configured to move independently of one another, wherein adjusting the second read heads comprises adjusting the second microslider, wherein the operations further comprise:
- writing, by the at least one write head on the first microslider, data to the storage medium, wherein the second read heads on the second microslider read the data written by the first microslider as part of the write-verify operation to verify the data written by the at least one write head.

* * * * *